United States Patent
Hudgens

(10) Patent No.: US 10,054,021 B2
(45) Date of Patent: Aug. 21, 2018

(54) ACCUMULATOR FOR AN ENGINE EXHAUST TREATMENT SYSTEM

(71) Applicant: Caterpillar Inc., Peoria, IL (US)

(72) Inventor: Jason W. Hudgens, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 235 days.

(21) Appl. No.: 15/057,486

(22) Filed: Mar. 1, 2016

(65) Prior Publication Data

US 2017/0254243 A1 Sep. 7, 2017

(51) Int. Cl.
*F01N 3/20* (2006.01)

(52) U.S. Cl.
CPC .......... *F01N 3/2066* (2013.01); *F01N 3/208* (2013.01); *F01N 2610/02* (2013.01); *F01N 2610/144* (2013.01); *F01N 2610/1413* (2013.01); *F01N 2610/1466* (2013.01); *F01N 2900/1808* (2013.01)

(58) Field of Classification Search
CPC .......... F01N 3/2066; F01N 2610/1413; F01N 2610/1466; F01N 2610/144
See application file for complete search history.

(56) References Cited

U.S. PATENT DOCUMENTS

| 3,567,191 | A | * | 3/1971 | Morgan | F15C 1/002 |
| | | | | | 123/444 |
| 3,822,193 | A | | 7/1974 | Chapman | |
| 4,009,596 | A | * | 3/1977 | Morse | F25B 43/006 |
| | | | | | 62/503 |
| 4,387,020 | A | * | 6/1983 | Hill | C02F 1/006 |
| | | | | | 210/137 |
| 8,967,181 | B2 | | 3/2015 | Wetzel et al. | |
| 2003/0155183 | A1 | * | 8/2003 | Nonaka | F01D 25/16 |
| | | | | | 184/6.23 |
| 2009/0322831 | A1 | * | 12/2009 | Emerton | B41J 2/17509 |
| | | | | | 347/85 |
| 2012/0044303 | A1 | * | 2/2012 | Park | B41J 2/175 |
| | | | | | 347/85 |

FOREIGN PATENT DOCUMENTS

| EP | 1092548 A2 | * | 4/2001 | ......... B41J 2/17556 |
| GB | 850883 A | * | 10/1960 | ............... F28B 9/06 |

* cited by examiner

*Primary Examiner* — Patrick Maines

(57) ABSTRACT

In accordance with one aspect of the present disclosure, an accumulator is provided for an engine exhaust treatment system. The accumulator includes a container, an inlet portion for receiving exhaust treatment fluid, a conduit in communication with the inlet portion of the container to withdraw exhaust treatment fluid from the inlet portion, and an outlet portion configured to receive exhaust treatment fluid from the inlet portion and having an outlet for discharging exhaust treatment fluid. The accumulator includes a weir separating the inlet portion and the outlet portion that permits exhaust treatment fluid in the inlet portion to flow into the outlet portion.

7 Claims, 4 Drawing Sheets

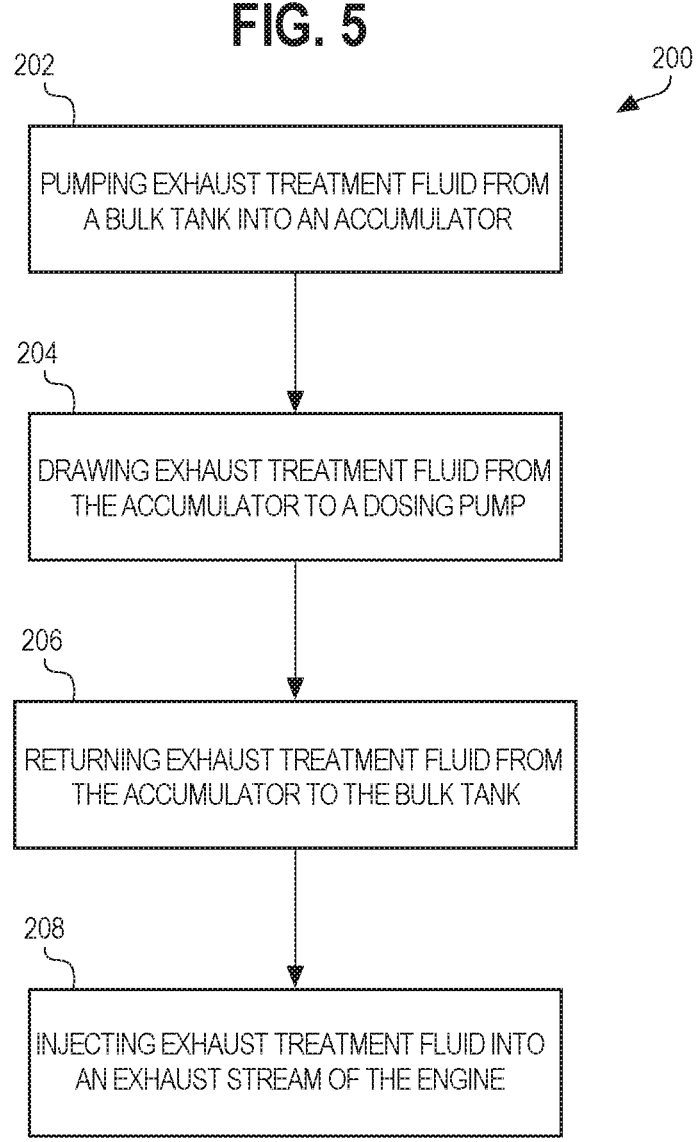

ACCUMULATOR FOR AN ENGINE EXHAUST TREATMENT SYSTEM

TECHNICAL FIELD

The present disclosure relates to exhaust treatment systems for internal combustion engines and, more particularly, to an accumulator used in handling exhaust treatment fluid in an engine exhaust treatment system.

BACKGROUND

Exhaust treatment systems may be used to reduce or remove components of the exhaust of internal combustion engines. Exhaust emission standards for internal combustion engines have become increasingly rigorous, and manufacturers have developed exhaust treatment systems to reduce the amount of certain components in the exhaust. For example, the amount of nitrogen oxides ($NO_x$) emitted from an engine may be limited by environmental regulations. For example, some exhaust treatment systems for diesel engines may discharge diesel exhaust fluid (DEF) into the exhaust stream to reduce the amount of $NO_x$ in the exhaust. DEF is a solution of urea and water (generally 32.5% chemical-grade urea and 67.5% de-ionized water) that is discharged into a mixing zone of an engine exhaust pipe upstream of a catalyst of a selective catalytic reduction (SCR) system. The exhaust with the $NO_x$ heats the DEF and causes the DEF to break down into ammonia ($NH_3$) and carbon dioxide ($CO_2$). As the $NO_x$ and ammonia pass over the catalyst, the $NO_x$ and ammonia react to produce nitrogen ($N_2$) and water.

Diesel engine exhaust treatment systems often include a large reservoir for storing the diesel exhaust fluid and a pump for withdrawing the diesel exhaust fluid from the reservoir. The pump advances the diesel exhaust fluid to a nozzle, which discharges the diesel exhaust fluid into the mixing zone of the exhaust pipe. For example, U.S. Pat. No. 8,967,181 discloses a diesel engine exhaust fluid system pumps fluid from a diesel exhaust fluid tank to a fluid-discharge nozzle coupled to a mixing zone of an exhaust pipe.

In some applications, the mixing zone of the exhaust pipe is located relatively far away from the reservoir of the system. The pump of the system therefore needs to be sufficiently powerful to pump the diesel exhaust fluid from the reservoir to the mixing zone. However, larger pumps capable of pumping the diesel exhaust fluid to the mixing zone may not provide high accuracy and fine adjustment of the volume of diesel exhaust fluid discharged into the mixing zone.

SUMMARY

In accordance with one aspect of the disclosure, an accumulator for an engine exhaust treatment system is provided that includes a container, a vent between the container and the atmosphere, and an inlet portion of the container for receiving exhaust treatment fluid. The accumulator includes a conduit in communication with the inlet portion of the container to withdraw exhaust treatment fluid from the inlet portion. The container also has an outlet portion configured to receive exhaust treatment fluid from the inlet portion and having a first outlet for discharging treatment fluid from the outlet portion. The accumulator also has means for separating the inlet portion and the outlet portion and permitting exhaust treatment fluid in the inlet portion to flow into the outlet portion. In one form, the means includes a weir separating the inlet portion and the outlet portion.

In accordance with another aspect, a method of operating an exhaust treatment system for an engine is provided. The method includes pumping exhaust treatment fluid from a bulk tank into an accumulator and drawing exhaust treatment fluid from the accumulator to a dosing pump. The method further includes returning exhaust treatment fluid from the accumulator to the bulk tank and injecting exhaust treatment fluid into an exhaust stream of the engine.

Other features and aspects of this disclosure will be apparent from the following description and the accompanying drawings.

BRIEF DESCRIPTION OF THE DRAWINGS

FIG. 5 is a flow chart disclosing a method of operating an exhaust treatment system including an accumulator for an engine.

DETAILED DESCRIPTION

Figure 1:
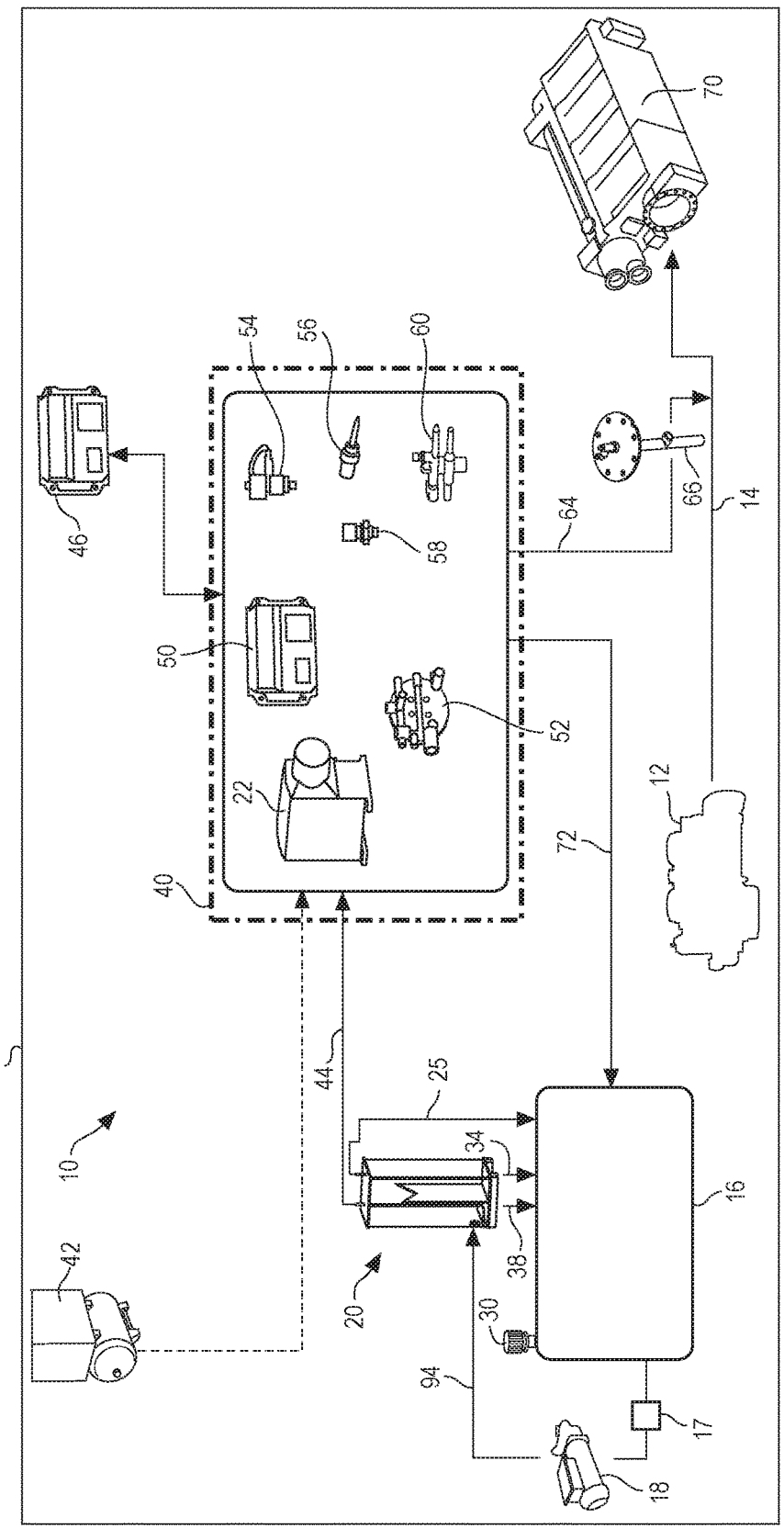
FIG. 1 is a schematic representation of portions of a machine including an exhaust treatment system for an engine of the machine.

In FIG. 1, an exhaust treatment system 10 of a machine 11 is provided for treating exhaust from an engine 12 of the machine 11. The engine 12 may be an internal combustion engine. The engine 12 may be fueled by gasoline, diesel fuel, biodiesel, dimethyl ether, alcohol, natural gas, propane, hydrogen, combinations thereof, or any other combustion fuel known in the art. The machine 11 may be a machine used for construction, aerospace, mining, railroad, forestry, power, marine, farming, or similar industries. The machines may be stationary machines, self-propelled vehicles, or vehicles intended to be pushed or pulled by another machine. In some embodiments, the machine may be, for example, a locomotive, a stationary power generator, gas turbines, a tractor, an on- or off-highway truck, car, earth moving equipment, material handler, pump, or logging machine.

Figure 3:
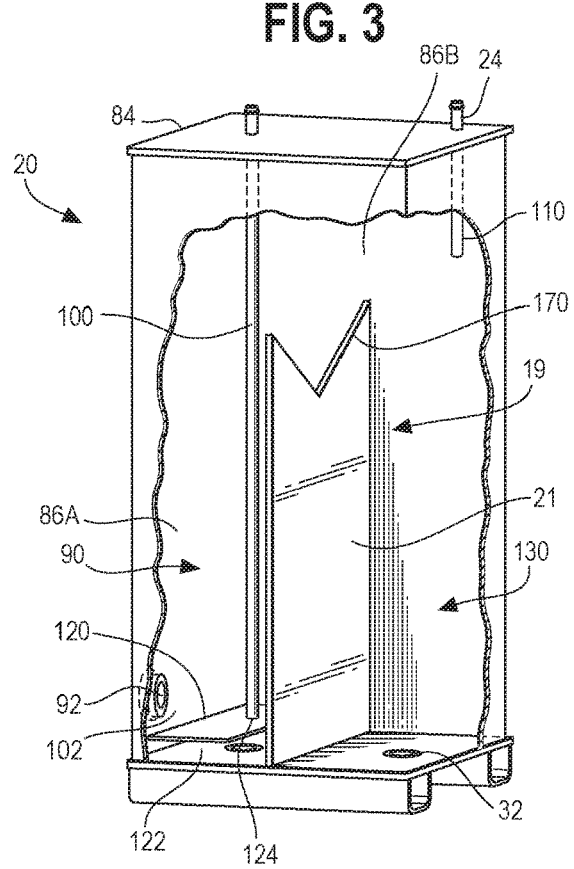
FIG. 3 is a view similar to FIG. 2 showing a portion of the accumulator removed to show a weir of the accumulator.
Figure 4:
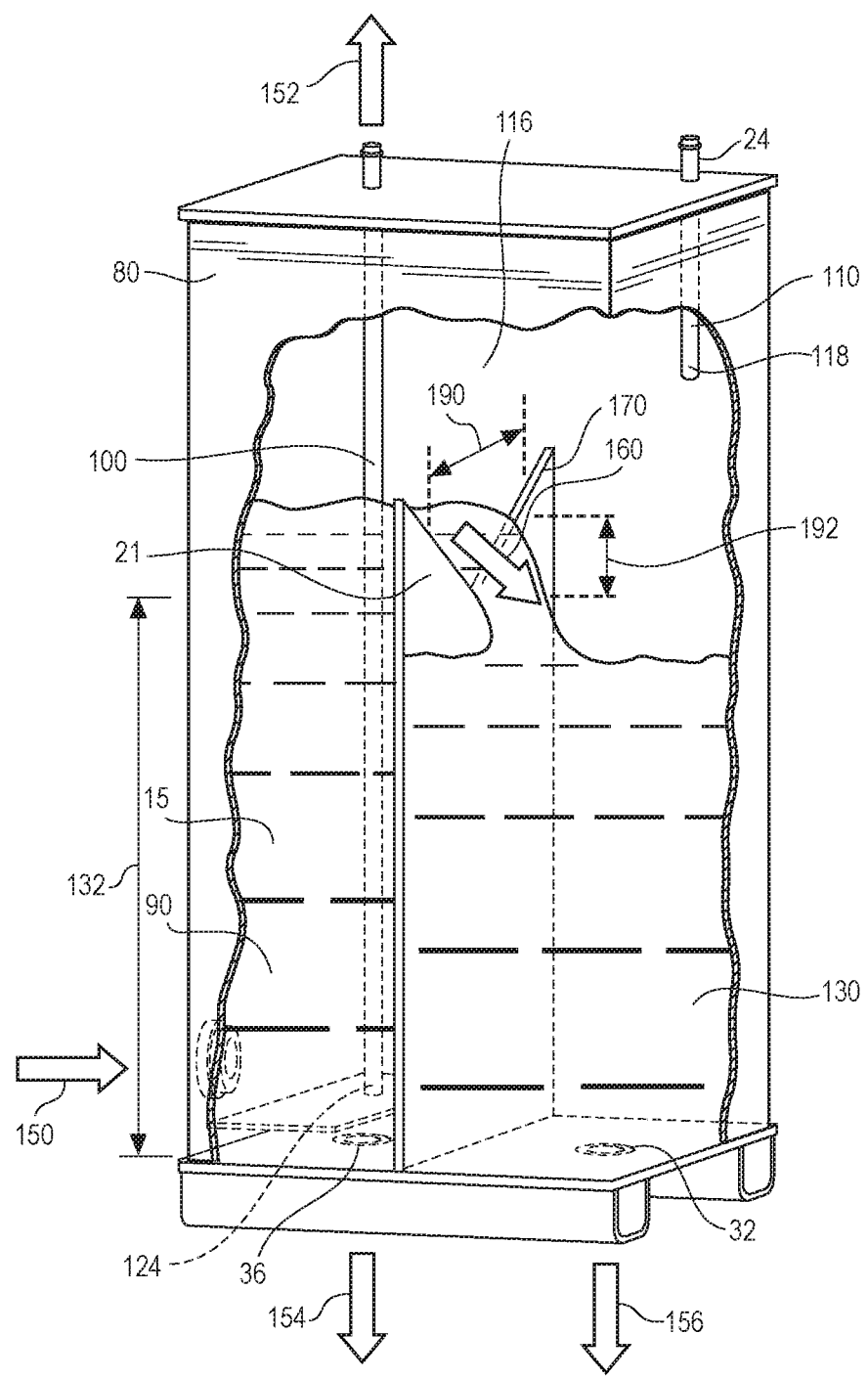
FIG. 4 is a view similar to FIG. 3 showing exhaust treatment fluid flowing from an inlet portion of the accumulator, over the weir, and into an outlet portion of the accumulator.

With reference to FIGS. 1 and 3, the exhaust treatment system 10 provides exhaust treatment fluid such as diesel exhaust fluid (DEF) 15, see FIG. 4, into an exhaust pipe 14 of the engine 12. The exhaust treatment system 10 includes a bulk tank 16 for storing DEF 15, a transfer pump 18, an accumulator 20, and a dosing pump 22. The transfer pump 18 pumps DEF 15 from the bulk tank 16 to the accumulator 20, and the accumulator 20 permits DEF 15 not drawn out of the accumulator 20 by the dosing pump 22 to return to the bulk tank 16. The accumulator 20 has a vent 24 that maintains a portion of the accumulator 20 at atmospheric pressure. The accumulator 20 thereby increases the accuracy of the dosing pump 22 because the DEF 15 within the accumulator 20 is generally not pressurized or under a vacuum, which can affect the flow rate of DEF 15 provided by each cycle of the dosing pump 22. Specifically, if the DEF 15 is pressurized within the accumulator 20, the dosing pump 22 may pump more DEF 15 with each cycle of the dosing pump 22 than has been requested by a dosing system electronic control module (ECM) 50. Conversely, if the DEF 15 is under a vacuum within the accumulator 20, the dosing pump 22 may pump less DEF 15 with each cycle of the dosing pump 22 than has been requested by the dosing system ECM 50. The vent 24 may vent the accumulator 20 directly to the atmosphere or a conduit 25 coupling the vent 24 to the bulk tank 16. The bulk tank 16 has a breather valve 30 which permits atmospheric air to travel into or exit the bulk tank 16 and keeps air within the bulk tank 16 generally at atmospheric pressure.

With reference to FIG. 1, the exhaust treatment system 10 includes a dosing system 40 that receives air from an air compressor 42, DEF 15 from the accumulator 20 via a supply line 44, and signals from an engine electronic control module (ECM) 46. The dosing system 40 includes the dosing pump 22, the dosing system ECM 50, and a DEF manifold 52. The dosing system 40 also includes at least one solenoid 54, temperature sensor 56, pressure sensor 58, and air manifold 60. The components of the dosing system 40 are operably configured to provide metered amounts of DEF 15 to an exhaust treatment fluid injector 66 via an injector line 64. The exhaust treatment fluid injector 66 injects the DEF 15 into the exhaust pipe 14 upstream of a catalyst of a selective catalytic reduction system 70. The dosing system 40 may also return DEF 15 to the bulk tank 16 via a return line 72.

Turning to FIG. 3, the accumulator 20 includes an inlet portion 90, an outlet portion 130, and means 19 separating the inlet and outlet portions 90, 130 and permitting DEF 15 in the inlet portion 90 to flow into the outlet portion 130. In one form, the means 19 includes a weir 21 separating the inlet and outlet portions 90, 130 and having an upper edge 170 that the DEF 15 can flow over into the outlet portion 130. In another form, the means 19 includes a weir having an opening through which the DEF 15 can flow into the outlet portion 130. The weir opening may be a circle, crescent, square, rectangle, triangle, or other shape. The weir may include one or more openings of the same or different sizes. In one form, the weir opening may have a width that varies along a height of the weir opening such that the volume of DEF 15 that can flow through the weir opening increases as the level of the DEF 15 in the inlet portion 90 rises. An example of such an opening would be an inverted triangle, which would provide a non-linear increase in flow as the DEF 15 rises in the inlet portion 90. In another form, the weir opening has a constant width along its height such that the volume of DEF 15 that can flow through the weir opening increases at a constant rate as the level of the DEF 15 in the inlet portion 90 rises. An example of such an opening would be a rectangle, which would provide a constant increase in flow as the DEF 15 rises in the inlet portion 90.

The inlet portion 90 receives DEF 15 from the transfer pump 18 and permits the dosing pump 22 to withdraw the DEF 15 from the inlet portion 90. The weir 21 controls the maximum volume of DEF 15 within the inlet portion 90 of accumulator 20 by permitting DEF 15 to flow into the outlet portion 130 once the DEF has reached a predetermined height within the inlet portion 90, as discussed in greater detail below. The outlet portion 130 receives DEF 15 from the inlet portion 90 and includes a first outlet, such as a return opening 32, coupled to a return line 34 (see FIG. 1). The return opening 32 permits DEF 15 that travels over the weir 21 (see FIG. 4) to return to the bulk tank 16. The return opening 32 may be a gravity drain that relies on the force of gravity to draw the DEF 15 through the return opening 32.

With reference to FIGS. 1 and 3, the inlet portion 90 of the accumulator 20 includes a second outlet, such as a drain opening 36 (see FIG. 4), coupled to a drain line 38. The drain opening 36 allows for DEF 15 in the accumulator 20 to return to the bulk tank 16. In one form, the drain opening 36 is a small, fixed drain opening 36 with a set volumetric flow rate such that a small volume of DEF 15 can continuously flow through the drain opening 36 and return to the bulk tank 16. The drain opening 36 may be a gravity drain that relies on the force of gravity to draw the DEF 15 through the drain opening 36. Upon shutdown of the machine 11 or stopping of the transfer pump 18, any DEF 15 within the accumulator 20 in the inlet portion 90 passively drains back to the bulk tank 16 via the drain opening 36 and the drain line 18 to empty the inlet portion 90. In another form, the drain opening 36 can be selectively opened and closed such as via a solenoid valve. For example, the drain opening 36 may remain closed during operation of the machine 11 and then the solenoid valve could open the drain opening 36 upon shutdown of the machine 11 to drain the DEF 15 from the inlet portion 90.

Figure 2:
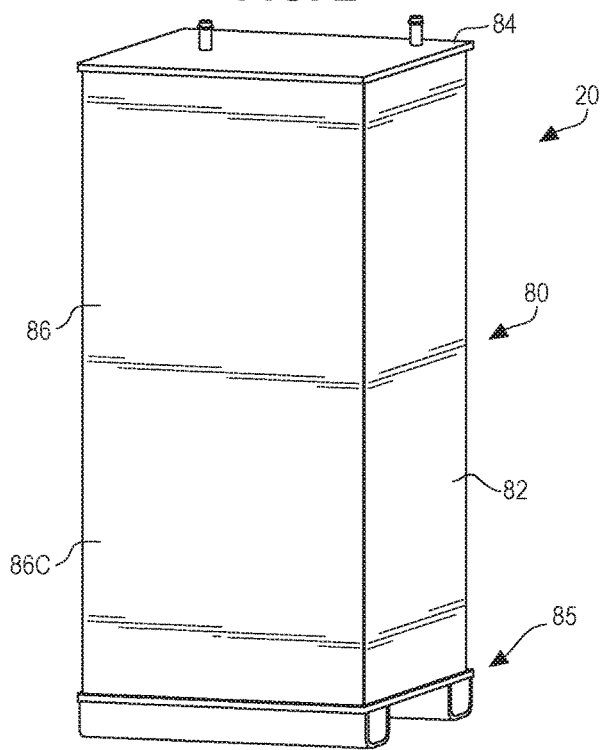
FIG. 2 is a perspective view of an accumulator of the exhaust treatment system of FIG. 1.

With reference to FIGS. 2 and 3, the accumulator 20 includes a container 80 with a body 82 and a releasable lid 84. The body 82 includes a base 85 and one or more side walls 86 upstanding from the base 85. In one form, the inlet portion 90 includes an inlet opening 92 in side wall 86A in communication with a supply line 94 (see FIG. 1) from the transfer pump 18. The accumulator 20 includes a conduit 100 depending from the releasable lid 84 and extending into a lower end 102 of the inlet portion 90. Conduit 100 is coupled to the supply line 44 (see FIG. 1) such that the dosing pump 22 may withdraw DEF 15 from the inlet portion 90 by drawing the DEF 15 through the conduit 100 and the supply line 44.

With reference to FIG. 3, the accumulator 20 includes a filter 120 positioned in the inlet portion 90. The filter 120 can be secured to one of the side walls 86, supported by a bottom wall 122, and/or secured to an end 124 of the conduit 100. The filter 120 extends across an opening of the end 124 of the conduit 100 and operates to impede debris from entering the conduit 100. The filter 120 may be used in addition to the inline filter 17 (see FIG. 1) and filters associated with the transfer pump 18 and/or the bulk tank 16.

Turning to FIGS. 3 and 4, the vent 24 includes a conduit 110 depending from the releasable lid 84 and having an end 118. When the container 80 contains DEF 15, the container 80 has an internal portion 116 above the DEF 15. The internal portion 116 contains air introduced into the container 80 at the vent 24. The end 118 of the conduit 110 is disposed in the internal portion 116 such that air may flow into or out of the conduit 110 to maintain the internal portion 116 of the container 80 generally at atmospheric pressure.

With reference to FIGS. 3 and 4, the weir 21 may be secured to side walls 86B, 86C and to the bottom wall 122 by welding. In another approach, the body 82 of the container 80 is molded such that the weir 21 is integrally formed with side walls 86B, 86C and the bottom wall 122. The weir 21 controls the flow of the DEF 15 from the inlet portion 90 into the outlet portion 130. In order for DEF 15 to flow over the weir 21 and into the outlet portion 130, the DEF 15 must first fill the inlet portion 90 to a height 132. The height 132 is selected to provide a sufficient volume of DEF 15 above the end 124 of the conduit 100 such that the dosing pump 22 is not starved for DEF 15 even under sudden, severe operating conditions of the engine 12. For example, the container 80 may have a total internal volume of seven gallons and the inlet portion 90 and weir 21 are configured to require the DEF 15 to fill the inlet portion 90 with five gallons of DEF 15 before the DEF 15 reaches the height 132 and begins to flow over the weir 21.

With reference to FIGS. 3 and 4, the DEF 15 flowing into the accumulator 20 and out of the accumulator 20 is balanced during operation of the machine 11. More specifically, the transfer pump 18 pumps an inlet flow 150 of the DEF 15 into the inlet portion 90 through the inlet opening 92 at a flow rate $Q_{150}$. The dosing pump 22 withdraws a dosing pump flow 152 of the DEF 15 from the inlet portion 90 at a flow rate $Q_{152}$. The drain opening 36 permits a drain flow 154 of the DEF 15 to exit the inlet portion 90 at a rate $Q_{154}$. The return opening 32 permits a return flow 156 of the DEF 15 to exit the outlet portion 130 at a rate $Q_{156}$. The balance of flows into ($Q_{150}$) and out of ($Q_{152}$, $Q_{154}$, $Q_{156}$) the accumulator 20 can be summarized as follows:

$$Q_{150}=Q_{152}+Q_{154}+Q_{156}$$

In other words, the flow rate of the inlet flow 150 of the DEF 15 from the transfer pump 18 equals the sum of the flow rates of the DEF 15 exiting the accumulator 20 by way of the dosing pump flow 152, the drain flow 154, and the return flow 156. For example, the transfer pump 18 may have a maximum $Q_{150}$ of 100 liters per hour and the dosing pump 22 may have a maximum $Q_{152}$ of 60 liters per hour. For this maximum flow rate example, the sum of $Q_{154}$ and $Q_{156}$ would equal 40 liters per hour.

When the dosing pump 22 draws little or no DEF 15 from the inlet portion 90, i.e., $Q_{152}$ is close to zero, the transfer pump 18 may continue to provide a constant $Q_{150}$. In this situation, the DEF from inlet flow 150 fills the inlet portion 90, flows in direction 160 over the weir 21, into the outlet portion 130, and returns to the bulk tank 16. Though drain opening 36 is relatively small such that the $Q_{154}$ is also small, at least some of the DEF 15 in the inlet portion 90 exits the inlet portion 90 by way of the drain flow 154.

When the dosing pump 22 withdraws DEF 15 from the inlet portion 90 at a high rate, i.e., $Q_{152}$ is high, the transfer pump 18 continues to provide a constant $Q_{150}$ and the $Q_{154}$ remains small. The high $Q_{152}$ may lower the level of DEF 15 in the inlet portion 90 below the height 132 such that the DEF 15 no longer flows over the weir 21 in direction 160 into outlet portion 130. Instead, the DEF 15 in the inlet portion 90 exits the inlet portion 90 in the dosing pump flow 152 or the drain flow 154. If the $Q_{152}$ remains high for an extended period of time, any remaining DEF 15 in the outlet portion 130 may completely drain from the outlet portion 130 through the return opening 32. Once $Q_{152}$ decreases, for example the engine 12 is no longer under a heavy load, the $Q_{150}$ remains constant and the $Q_{154}$ remains small such that the inlet portion 90 may fill again to the height 132 and begin to flow over the weir 21 and into the outlet portion 130.

The transfer pump 18 may be operated to provide a constant $Q_{150}$ of the inlet flow 150 of the DEF 15 in the inlet portion 90. In other approaches, the transfer pump 18 may be operated to vary the $Q_{150}$. For example, the transfer pump 18 may decrease $Q_{150}$ when the dosing pump 22 has been withdrawing the DEF 15 at a low $Q_{152}$ for an extended period of time.

Referring to FIG. 4, the weir 21 may have a configuration that provides a controlled amount of DEF 15 to flow over the weir 21 once the DEF 15 has filled the inlet portion 90. For example, the upper edge 170 of the weir 21 can take a variety of forms including v-shaped. For this embodiment, the flow rate of DEF 15 over the weir 21 can be calculated using a width 190 of the weir 21 at the highest point of the DEF 15 flowing across the weir 21 and a height 192 of the DEF 15 above the lowest point of the upper edge 170, as shown in FIG. 4. Specifically, the flow rate may be calculated as:

$$Q=0.266 \times cB \times (2g)^{0.5} \times H^{1.5}$$

where:
Q is equal to the flow rate (m$^3$/s)
c is equal to the discharge coefficient, which may be averaged as 0.62
B is equal to the width 190 (m)
g is equal to a gravitational constant, 9.81 m/s$^2$
H is equal to the height 192 (m)

With this flow rate Q, the weir 21 may be configured for a particular application including the size of the transfer pump 18 and the dosing pump 22. The drain opening 36 may be permanently open, or selectively opened, but in general has a small flow rate and is used primarily to ensure that all of the DEF 15 in the inlet portion 90 drains from the inlet portion 90 upon shutdown of the exhaust treatment system 10. Thus, the transfer pump 18, dosing pump 22, and drain opening 36 are sized to ensure that the dosing pump 22 is provided with a sufficient supply of DEF 15 in the inlet portion 90 during operation of the engine 12.

The accumulator 20 and the other components of the dosing system 40 are made from materials that resist corrosion by the DEF 15 and are sufficiently strong to handle the pressures and flow of the DEF 15 during operation of the machine 11. For example, the container 80 including the weir 21 may be made of roto molded nylon plastic. In another form, the container 80 and the weir 21 may be made of stainless steel, for example a 300 series grade stainless steel such as a 304 grade stainless steel.

With reference to FIGS. 1 and 5, a method 200 for operating the exhaust treatment system 10 is provided. The method includes pumping 202 exhaust treatment fluid, such as the DEF 15, from the bulk tank 16 into the accumulator 20. The pumping 202 may include pumping the DEF 15 at a constant flow rate or at a varying rate from the bulk tank 16 to the accumulator 20. Further, the transfer pump 18 may be operated for a period of time at startup of the machine 11 to ensure that the inlet portion 90 of the accumulator 20 is sufficiently filled prior to operation of the dosing pump 22.

The method 200 includes drawing 204 exhaust treatment fluid, such as DEF 15, from the accumulator 20 to the dosing pump 22. The pumping 202 and the drawing 204 may be performed independently of each other. Specifically, the transfer pump 18 may be operated at a constant flow rate while the dosing pump 22 is operated only as needed to supply DEF 15 to the exhaust treatment fluid injector 66. Unused DEF 15 in the accumulator 20 exits the accumulator 20 through the return opening 32 or the drain opening 36 and returns to bulk tank 16. In this manner, the flow rate of the dosing pump 22 can be closely tailored to the current and changing demands of the engine 12 while the transfer pump 18 operates at a constant flow rate, such as a flow rate where the transfer pump 18 operates at or near its maximum efficiency.

The method 200 further includes returning 206 exhaust treatment fluid, such as DEF 15, from the accumulator 20 to the bulk tank 16. In one form, the returning 206 includes returning the DEF 15 from the accumulator 20 to the bulk tank 16 while pumping DEF 15 from the bulk tank 16 to the accumulator 20 via the transfer pump 18. The returning 206 may include removing the DEF 15 from the accumulator 20 to the bulk tank 16 via the return opening 32 and the drain opening 36. The method 200 may therefore include removing the DEF 15 from the accumulator via two openings, the return opening 32 and the drain opening 36. As noted above, the drain opening 36 can be relatively small for emptying the inlet portion 90 upon shut down of the machine 11 and the return opening 32 may be much larger to ensure that the DEF 15 in the outlet portion 130 empties quickly via the return opening 32.

The method 200 further includes injecting 208 the DEF 15 into the engine exhaust pipe 14 via the exhaust treatment fluid injector 66. The DEF 15 mixes with the exhaust stream from the engine 12 and decomposes into ammonia ($NH_3$) and carbon dioxide ($CO_2$). As the $NO_x$ from the exhaust stream and ammonia pass over the catalyst of selective catalytic reduction system 70, the $NO_x$ and ammonia react to produce nitrogen ($N_2$) and water.

The method 200 may also include flowing the exhaust treatment fluid, such as DEF 15, over the weir 21 (see FIG. 4). The method 200 may further include maintaining a portion of the internal volume of the accumulator 20 at atmosphere pressure, such as by the vent 24.

In some approaches, the pumping 202 of the exhaust treatment fluid from the bulk tank 16 to the accumulator 20 includes pumping the DEF 15 from the bulk tank 16 to the accumulator at a first flow rate, e.g., $Q_{150}$ discussed above. Further, the returning 206 of the DEF 15 from the accumulator 20 to the bulk tank may include returning the DEF 15 from the accumulator 20 to the bulk tank 16 at a second flow rate, e.g., the sum of $Q_{154}$ and $Q_{156}$ discussed above, which is less than the first flow rate $Q_{150}$. Still further, the drawing 204 of the DEF 15 from the accumulator 20 to the dosing pump 22 may include drawing the DEF 15 from the accumulator 20 to the dosing pump 22 at a third flow rate, e.g., $Q_{152}$ discussed above, which is less than the first flow rate.

INDUSTRIAL APPLICABILITY

The industrial applicability of the embodiments of an accumulator and method described herein will be readily appreciated from the foregoing discussion. The disclosed accumulator and method may be used in a variety of exhaust treatment systems, and particularly in diesel exhaust systems utilizing urea-based diesel exhaust fluid (DEF). Embodiments of the accumulator may find potential application in machines used for construction, aerospace, mining, railroad, forestry, power generation, marine, farming, or similar industries. The machines may be stationary machines, self-propelled vehicles, or vehicles intended to be pushed or pulled by another machine. Exemplary machines include locomotives, stationary power generators, gas turbines, tractors, on- or off-highway trucks, cars, earth moving equipment, material handlers, pumps, or logging machines.

An exhaust treatment system for an engine generally includes a dosing system that receives air from an air compressor, DEF from the accumulator via a supply line, and signals from an engine electronic control module (ECM). The dosing system includes a dosing pump, a dosing system ECM, and a DEF manifold. The components of the dosing system are operably configured to provide metered amounts of DEF to an injector via an injector line. The injector injects the DEF into the exhaust pipe upstream of a catalyst of a selective catalytic reduction system. The dosing system may also return DEF to the bulk tank via a return line.

In general, an accumulator is disclosed that may be utilized with exhaust treatment systems to improve the performance of the dosing system and provide increased protection against DEF freezing in cold operating conditions. In one aspect of the present disclosure, the accumulator includes a container, an inlet portion of the container for receiving exhaust treatment fluid, a conduit in communication with the inlet portion to withdraw exhaust treatment fluid from the inlet portion, and an outlet portion of the container configured to receive exhaust treatment fluid from the inlet portion The accumulator further includes means, such as a weir, for separating the inlet and outlet portions and permitting exhaust treatment fluid in the inlet portion to flow into the outlet portion. In one form, the weir is configured to permit exhaust treatment fluid to flow into the outlet portion once the exhaust treatment fluid has reached a predetermined height within the inlet portion. The height is selected to provide a sufficient volume of exhaust treatment fluid within the inlet portion for being withdrawn via the conduit even under sudden, high-load operation of the engine.

In at least one embodiment, the accumulator has a vent between the container and the atmosphere which generally maintains air within the container at atmospheric pressure. This inhibits the buildup of pressure or creation of a vacuum within the container during operation which, in turn, makes it easier for a dosing pump connected to the conduit to withdraw fluid from the inlet portion of the container. Further, the dosing pump may operate more accurately because the volume of exhaust treatment fluid pumped with each cycle of the dosing pump is not disrupted by pressure or vacuum within the container.

Various embodiments of the accumulator includes a first outlet of the outlet portion for discharging exhaust treatment fluid from the outlet portion back to a source of the exhaust treatment fluid, such as bulk tank. The first outlet of the outlet portion thereby allows for recirculation of exhaust treatment fluid between the accumulator and the bulk tank. The recirculation of the exhaust treatment fluid may reduce the risk of the exhaust treatment fluid freezing during cold operating conditions. The recirculation may also allow for further filtering to remove particulates from the DEF prior to being drawn out of the accumulator with the dosing pump. For example, the DEF may pass through an inline filter when the DEF is pumped by the transfer pump from the bulk tank to the accumulator.

In one form, the inlet portion of the container includes a second outlet that permits exhaust treatment fluid to be removed from the inlet portion upon shut down of the machine. Upon shutdown of the machine, the exhaust treatment fluid in the inlet portion of the container may exit the container through the second outlet and the exhaust treatment fluid in the outlet portion of the container may exit the container through the first outlet. In this manner, the container empties upon shutdown of the machine which may further limit the risk of exhaust treatment fluid freezing within the accumulator during cold operating conditions.

In another embodiment, a method of operating an exhaust treatment system for an engine is provided. The method includes pumping exhaust treatment fluid from a bulk tank into an accumulator and drawing exhaust treatment fluid from the accumulator to a dosing pump. The method further includes returning exhaust treatment fluid from the accumulator to the bulk tank and injecting exhaust treatment fluid into an exhaust stream of the engine. By returning exhaust treatment fluid from the accumulator to the bulk tank, the exhaust treatment fluid may be constantly recirculated within the exhaust treatment system which may reduce the likelihood of freezing. Further, returning exhaust treatment fluid from the accumulator to the bulk tank permits pumping of exhaust treatment fluid from the bulk tank to the accumulator at a constant, steady flow rate while the dosing pump withdraws only the exhaust treatment fluid needed for injection into the exhaust stream. This enables the dosing pump to operate with high accuracy since it is withdrawing only the volume of exhaust treatment needed to be injected into the exhaust stream. The method may further include maintaining a portion of an internal volume of the accumulator at atmospheric pressure. This further enhances the accuracy of the dosing pump because the exhaust treatment fluid being withdrawn from the accumulator is not pressurized or under a vacuum.

Those skilled in the art will recognize that a wide variety of modifications, alterations, and combinations can be made with respect to the above described embodiments, and that such modifications, alterations, and combinations, are to be viewed as being within the scope of the disclosure. Methods described herein can be performed in any suitable order unless otherwise indicated herein or otherwise clearly contradicted by context.

What is claimed is:

1. An exhaust treatment system for an engine, the system comprising:
   a bulk tank for storing exhaust treatment fluid;
   a transfer pump configured to pump exhaust treatment fluid from the bulk tank;
   an accumulator having an inlet portion that receives exhaust treatment fluid from the transfer pump;
   an exhaust treatment fluid injector;
   a dosing pump configured to withdraw exhaust treatment fluid from the inlet portion of the accumulator and provide exhaust treatment fluid to the exhaust treatment fluid injector;
   an outlet portion of the accumulator operably coupled to the bulk tank to permit exhaust treatment fluid to return to the bulk tank; and
   a weir of the accumulator separating the inlet and outlet portions of the accumulator and permitting exhaust treatment fluid in the inlet portion to flow to the outlet portion.

2. The system of claim 1 wherein the accumulator includes a vent in communication with the atmosphere.

3. The system of claim 2 further comprising a conduit coupling the vent of the accumulator to the bulk tank, and the bulk tank includes a breather valve.

4. The system of claim 1 wherein the inlet portion of the accumulator is operably coupled to the bulk tank to permit exhaust treatment fluid to return to the bulk tank.

5. The system of claim 1 wherein the accumulator includes a conduit extending into the inlet portion of the accumulator, the dosing pump being coupled to the conduit and configured to withdraw exhaust treatment fluid from the inlet portion of the accumulator.

6. The system of claim 1 wherein the dosing pump has a maximum flow rate and the transfer pump has a maximum flow rate greater than the maximum flow rate of the dosing pump.

7. The system of claim 1 wherein the weir includes an upper edge configured to permit exhaust treatment fluid to flow over the weir and into the outlet portion.

* * * * *